United States Patent

[11] 3,542,247

[72] Inventor Alfred Racek
　　　　　　Zwerngasse 59, 1170 Vienna, Austria
[21] Appl. No. 717,780
[22] Filed April 1, 1968
[45] Patented Nov. 24, 1970

[54] ADJUSTABLE VALVE ASSEMBLY FOR GAS-FUELLED LIGHTERS
　　　5 Claims, 4 Drawing Figs.
[52] U.S. Cl. .................................................. 222/3, 431/344
[51] Int. Cl. .................................................. B67b 7/24
[50] Field of Search .......................................... 222/3; 431/344

[56] References Cited
UNITED STATES PATENTS
| | | | |
|---|---|---|---|
| 491,272 | 2/1893 | Schier | 222/3X |
| 3,315,496 | 4/1967 | Newman | 222/3 |

*Primary Examiner*—Samuel Coleman
*Attorney*—Stevens, Davis, Miller & Mosher

ABSTRACT: A frame structure defines a liquefied gas reservoir and an outlet passage communicating with said reservoir. A resilient throttling member is disposed in said outlet passage and compressible in varying degrees to vary the gas flow through said outlet passage. An adjusting member is mounted in said frame structure for adjustment in a predetermined direction to vary the degree of compression of said throttling member. A mating member is mounted in said frame structure. Said adjusting and mating members are mounted in said frame structure to be rotatable relative to each other. At least one of said adjusting and mating members is provided with at least one cam track, which is inclined to a plane that is normal to said predetermined direction. Said cam track is in engagement with the other of said adjusting and mating members. A rotation of said adjusting and mating members relative to each other will cause the adjusting member to move in said predetermined direction relative to said throttling member.

Patented Nov. 24, 1970 3,542,247
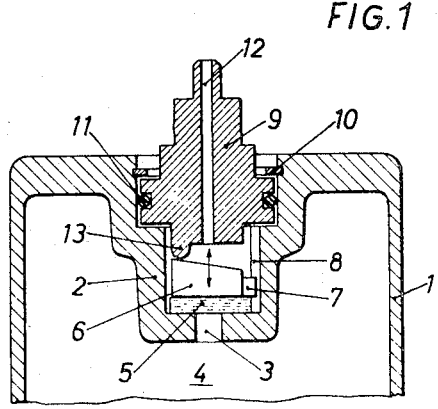
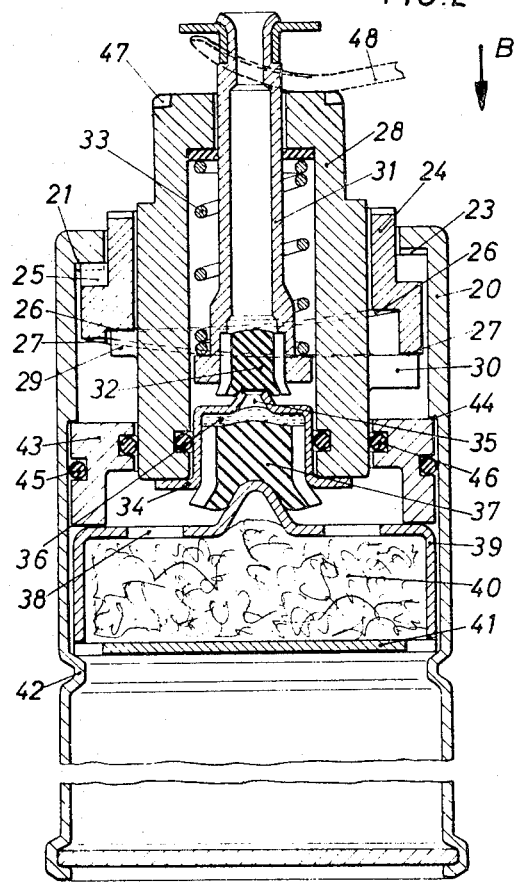
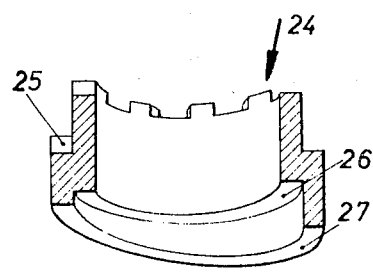
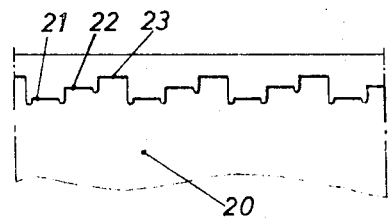

3,542,247

ADJUSTABLE VALVE ASSEMBLY FOR GAS-FUELLED LIGHTERS

This invention relates to a gas-fuelled lighter which comprises a resilient throttling member, which serves for regulating the gas stream and the height of the flame and which is adapted to be compressed by an adjusting member, which is movable relative to the throttling member. In the known gas lighters of this kind, the adjusting member consists of a screw. As a small displacement is sufficient to compress the throttling member, that screw must have a very small lead and for this reason can be manufactured only with difficulty. Besides, stops must cooperate with these helical adjusting members to prevent a complete unscrewing of the screws because this would result in a sudden outflow of gas.

It is an object of the invention to avoid the disadvantages of the known gas-fuelled lighters. This is accomplished in that the adjusting member and/or a mating member which cooperates with and is adjustable relative to the adjusting member is provided with at least one cam track, which is inclined with respect to a plane that is normal to the direction of movement of the adjusting member so that a relative rotation of the adjusting member and mating member will cause a movement of the adjusting member toward or away from the throttling member.

The gas-fuelled lighter according to the invention can be adjusted to compress the throttling member to the desired degree much more easily than the known screws because the inclination of the cam track can be selected as desired. No stops are required to limit the adjusting movement.

The provision of a cam track which is closed in itself has proved particularly desirable. In this case the adjusting member can always be rotated in one direction to adjust the height of the flame between a maximum and a minimum.

The invention will now be described with reference to two illustrative embodiments shown by way of example on the accompanying drawings, although the invention is not restricted to said embodiments.

FIG. 1 is a sectional view taken through the top part of a gas tank of one embodiment.

FIG. 2 is a similar view showing a different embodiment.

FIGS. 3 and 4 show details of the lighter according to FIG. 2. FIG. 1 shows a gas tank 1, which can be inserted into a conventional lighter, which is provided with an igniting mechanism. The tank 1 has a cup-shaped recess 2 at its top end. An opening 3 is formed in the bottom of said recess and connects the interior of the recess 2 to the tank space 4, which contains liquefied gas. A porous throttling member 5 consisting, e.g., of paper, is disposed above the bottom of the recess and is compressed by an adjusting member 6. In the example shown in the drawing, the adjusting member consists of a circular cylinder, which has been cut off obliquely and is provided with a nose 7, by which the adjusting member is nonrotatably guided in a track 8, which is provided at the wall of the recess 2. A mating member 9 is also cylindrical and is rotatably mounted in the recess 2. The mating member 9 is axially held by a split locking ring 10 and sealed at its periphery by an O-ring 11. The mating member 9 has an axial duct 12, through which the gas can flow out as soon as a cap (not shown) of the lighter is lifted off.

The mating member 9 is provided with a nose 13 at that end which faces the adjusting member 6. The nose 13 rests on the obliquely cutoff portion of the adjusting member. That obliquely cutoff portion forms a cam track, which is inclined to a plane that is normal to the direction of movement of the adjusting member. That plane is indicated by the double arrow. A rotation imparted to the mating member 9 will thus change the pressure which is exerted by the nose 13 on the adjusting member 6 so that the compression of the throttling member 5 is changed and more or less gas can flow through the bore 3, the throttling member 5 and the duct 12.

In the embodiment shown by way of example in FIGS. 2 to 4, the gas tank 20 is provided at its top edge with extensions 21, 22 and 23, which are on different levels and spaced around the periphery of the tank. To illustrate this detail, a development of a portion of that top edge into a plane is shown in FIG. 4. A mating member 24 has, e.g., three noses 25, which are in engagement with a selected one of the sets of extensions 21, 22 or 23. At its end opposite to the noses 25, the mating member 24 is provided with two cam tracks 26 and 27, which are inclined relative to each other. This design is distinctly apparent from FIG. 3, where the mating member is shown alone.

An adjusting member 28 is rotatably mounted in the mating member 24 and has two diametrically opposite extensions 29 and 30, which have different lengths. The extension 29 lies on the inner cam track 26 and the extension 30 lies on the concentric outer cam track 27.

A valve stem 31 is guided in the adjusting member 28. A valve member 32 having a serrated periphery is inserted in the valve stem 31, which is urged by a spring 33 against a cup member 34 so that the valve member 32 in the closed position of the gas valve closes the opening 35 of member 34. A throttling member 36 of resilient, porous material is disposed inside the cup member 34. The member 34 contains also a rubber plug 37, which is serrated at its periphery and bears on a cup 39, which is formed with openings 38. The cup 39 is filled with absorbent material 40, such as felt, and bears on a disc 41, which is serrated at its periphery. The disc 41 rests on beads 42 formed on the gas tank 20.

A ring 43 bears at one end on the cup 39 and at the other end on a shoulder 44 of the gas tank 20. The ring 43 is formed on its inside and outside peripheries with grooves for receiving sealing rings 45 and 46.

The illustrated device has the following mode of operation:

The liquefied gas contained in the gas tank 20 contacts the felt 40 whenever the tank is tilted so that the felt absorbs part of the liquefied gas. The adjusting member 28 is provided at its upper end with teeth 47. A lever 48 shown in dotted lines in FIG. 2 is provided in the lighter and serves to lift the valve stem 31. When it is desired to ignite the lighter, the lever 48 is moved in known manner in the direction of the arrow B. When the valve stem 31 has been lifted, the gas flows over the periphery of the plug 37 and through the throttling member 36 and the opening 35, further past the valve member 32 and outwardly through the hollow valve stem.

The flow rate and with it the height of the flame will depend on the degree of compression of the throttling member 36.

The compression may be adjusted by the manufacturer by a rotation of the mating member 24 to such an extent that its noses 25 rest on extensions 21 or 22 or 23. With the design shown in FIG. 4, the noses interengage with the extensions.

To adjust the height of the flame, the gas tank 20 is rotated relative to the lighter. When the lever 48 is depressed, it enters the teeth 47 so that the adjusting member is nonrotatably connected to the lighter by the lever 48. The mating member 24 rotates in unison with the tank 20 so that the cam tracks 26, 27 slide on the respective extensions 29, 30 and the part 34 of the adjusting member 28 is urged more or less strongly against the throttling member. Because each cam track 26, 27 is closed in itself, the gas tank 20 can be constantly rotated in one direction. The provision of two cam tracks which have the same inclination relative to a center plane which is normal to the axis of the gas tank ensures that the adjusting member is always guided along a straight line so that the axes of the adjusting member and mating member are alined in all positions.

I claim:
1. A gas-fuelled lighter comprising:
   a. frame structure means defining a liquefied gas reservoir and an outlet passage communicating with said reservoir;
   b. a resilient porous throttling member disposed in said outlet passage and compressible in varying degrees to vary the gas flow through said outlet passage, the porosity varying with the degree of compression;
   c. an adjusting member mounted in said frame structure means for adjustment in a predetermined direction to vary the degree of compression of said throttling member;
   d. a mating member mounted in said frame structure means;

e. said adjusting and mating members mounted in said frame structure means rotatable relative to each other and said frame means;
f. one of said adjusting and mating members being provided with two endless cam tracks which are concentric and inclined relative to each other along their total circumference to a plane that is normal to said predetermined direction and the other member rests on both said cam tracks and is provided with two diametrically opposite extensions of different lengths, each resting on one cam track;
g. said cam track being in engagement with the other of said adjusting and mating members; and
h. whereby a rotation of said adjusting and mating members relative to each other will cause the adjusting member to move in said predetermined direction relative to said throttling member.

2. A gas-fuelled lighter as set forth in claim 1, in which said mating member annularly surrounds said adjusting member and is provided at one end with two oppositely handed, concentric cam tracks, and said mating member is provided at the end remote from said cam tracks with at least two noses selectively engageable with said stops.

3. A gas-fuelled lighter as set forth in claim 2, in which said frame comprises a lighter body provided with said stops.

4. A gas-fuelled lighter as set forth in claim 2, in which said frame structure comprises a gas tank defining said reservoir and provided with said stops.

5. A gas-fuelled lighter comprising:

a. frame structure means defining a liquefied gas reservoir and an outlet passage communicating with said reservoir;
b. a resilient porous throttling member disposed in said outlet passage and compressible in varying degrees to vary the gas flow through said outlet passage, the porosity varying with the degree of compression;
c. an adjusting member mounted in said frame structure means for adjustment in a predetermined direction to vary the degree of compression of said throttling member;
d. a mating member mounted in said frame structure means;
e. said adjusting and mating members mounted in said frame structure means rotatable relative to each other;
f. at least one of said adjusting and mating members being provided with at least one endless cam track which is inclined along its total circumference to a plane that is normal to said predetermined direction;
g. said cam track being in engagement with the other of said adjusting and mating members;
h. said frame structure means is provided with stops on different levels, said stops engageable with one of said adjusting and mating members for a coarse adjustment of said adjusting member; and
i. said cam track serving as a fine adjustment of the adjustment member whereby a rotation of said adjusting and mating members relative to each other will cause the adjusting member to move in said predetermined direction relative to said throttling member.